United States Patent
Karaoguz et al.

(10) Patent No.: US 6,438,109 B1
(45) Date of Patent: Aug. 20, 2002

(54) METHOD TO ESTABLISH A HOME NETWORK ON MULTIPLE PHYSICAL LAYERS

(75) Inventors: Jeyhan Karaoguz, Norton; Walter Chen, Franklin, both of MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/499,209

(22) Filed: Feb. 7, 2000

(51) Int. Cl.[7] .................................................. H04J 1/16
(52) U.S. Cl. ........................................ 370/252; 370/445
(58) Field of Search ................................. 370/252, 248, 370/253, 285, 338, 245, 352, 353, 401, 437, 450, 457, 431, 432, 445, 447

(56) References Cited

U.S. PATENT DOCUMENTS

| | | | | |
|---|---|---|---|---|
| 4,781,427 A | * | 11/1988 | Husbands et al. | 385/24 |
| 5,648,984 A | * | 7/1997 | Kroninger et al. | 375/211 |
| 5,742,668 A | * | 4/1998 | Pepe et al. | 455/415 |
| 6,026,150 A | * | 2/2000 | Frank et al. | 379/90.01 |
| 6,052,380 A | * | 4/2000 | Bell | 370/445 |
| 6,167,120 A | * | 12/2000 | Kikinis | 379/90.01 |
| 6,208,637 B1 | * | 3/2001 | Eames | 370/352 |
| 6,243,413 B1 | * | 6/2001 | Beukema | 375/222 |

* cited by examiner

Primary Examiner—Dang Ton
Assistant Examiner—Brian Nguyen
(74) Attorney, Agent, or Firm—Joanne N. Pappas

(57) ABSTRACT

A home networking architecture and a physical layer protocol is configured such that a communication device in the home can access a home network over any one of the available transmissions media, i.e. in-house telephone wiring or electrical wiring, or a wireless network. The proposed networking architecture utilizes a bridging concept of combining multiple LANs residing on the different physical mediums available in the home, or small office building, or any other situation where a network is desired but adding additional infrastructure is undesirable or not possible.

16 Claims, 6 Drawing Sheets

METHOD TO ESTABLISH A HOME NETWORK ON MULTIPLE PHYSICAL LAYERS

FIELD OF THE INVENTION

This invention relates generally to telecommunications and computer networks and more particularly to establishing a network combining a plurality of types of physical transmissions media available in the home.

BACKGROUND OF THE INVENTION

The development of broadband network access devices such as cable and xDSL modems enable high-speed network access from the home. Presently, highest speed network access in the home generally occurs between a WAN (e.g. the Internet) and a single communication device in the home (e.g. a PC with a TCP/IP stack) by means of a cable modem via an 802.3 10BaseT Ethernet interface or a Universal Serial Bus (USB) interface. The availability of high-speed network access combined with the ready availability of network-enabled devices to consumers, including printers, storage devices, and smart appliances as well as computers, has created a demand for home networks.

The home network, or any other small, non-professionally run network, presents special problems. First, the network desired by the user may require infrastructure that the user may not want, or may not be able, to install. Currently, the already-existing infrastructure of telephone lines or electrical wiring may be used as part of the transmissions media for the network. Alternatively, a wireless transmissions system may also be used as a transmissions medium. These transmissions media cannot currently be combined in a single network. Current art provides connectivity between an outside WAN and a single home LAN on either phone line or electrical wiring or by wireless transmission. The problem is that a seamless network from anywhere in the home is not always possible. For example, there is not always a phone jack in every room, or an electrical wire may not provide a reliable connection between certain places in the home. Consequently, the reach of the home LAN is limited to the reach of the particular physical medium used. It is desirable to increase the home network access by combining multiple transmissions media in a single network.

The second difficulty in home networks is the need for the home network to be easily operated and maintained by a user who is not a computer professional. The home network needs to be as simple as possible. It is desirable to have a network that requires a minimum of manipulation on the part of the user in order to set up, operate and maintain the network.

It is an object of the present invention to provide a method and apparatus that establishes a computer network on a combination of telephone line, electrical wiring and/or wireless transmissions media.

It is another object of the present invention to provide a method and apparatus for a home computer network that requires a minimum of administrative tasks for the user.

SUMMARY OF THE INVENTION

The problems of establishing a far-reaching and easily operated home network are solved by the present invention of a home network in multiple physical layers.

A home networking architecture and a physical layer protocol is configured such that a communication device in the home can access a home network over any one of the available physical transmissions media, i.e. in-house telephone wiring or electrical wiring, or a wireless network. The proposed networking architecture utilizes a bridging concept of combining multiple LANs residing on the different physical mediums available in the home, or small office building, or any other situation where a network is desired but adding additional infrastructure is undesirable or not possible.

The bridging function resides in the home hub. With such a hub, a communication device connected to telephone wiring can seamlessly establish communication with another communication device connected to the electrical wiring or to a wireless medium.

The present invention together with the above and other advantages may best be understood from the following detailed description of the embodiments of the invention illustrated in the drawings, wherein:

DETAILED DESCRIPTION OF PREFERRED EMBODIMENTS

Figure 1:
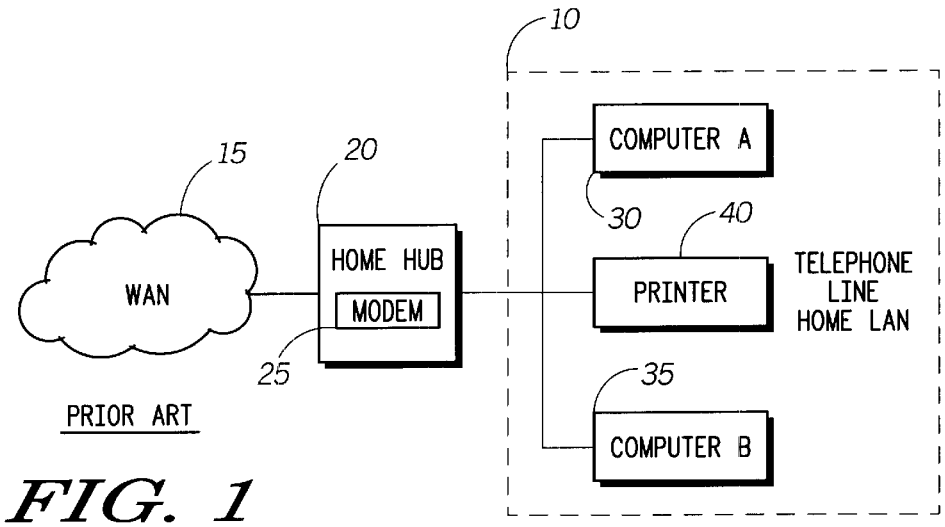
FIG. 1 is a block diagram of a prior art home network.

FIG. 1 shows a prior art home network using a telephone wiring local area network (LAN) 10 with a connection to an outside wide area network (WAN) 15, such as the Internet via a home hub 20. The home hub 20 has a modem 25 to establish a connection to the WAN 15. In the present invention, the modem 25 is a cable modem, an XDSL modem, or a V.90 modem, however the invention is not limited to these devices. The home hub 20 also provides a hub connection to the LAN 10. The LAN 10 connects three devices, Computer A 30, Computer B 35, and a printer 40. The home networking configuration shown in FIG. 1 does not provide seamless network access from all places in the home because telephone line connections may not be available at all locations where they are needed.

Figure 2:
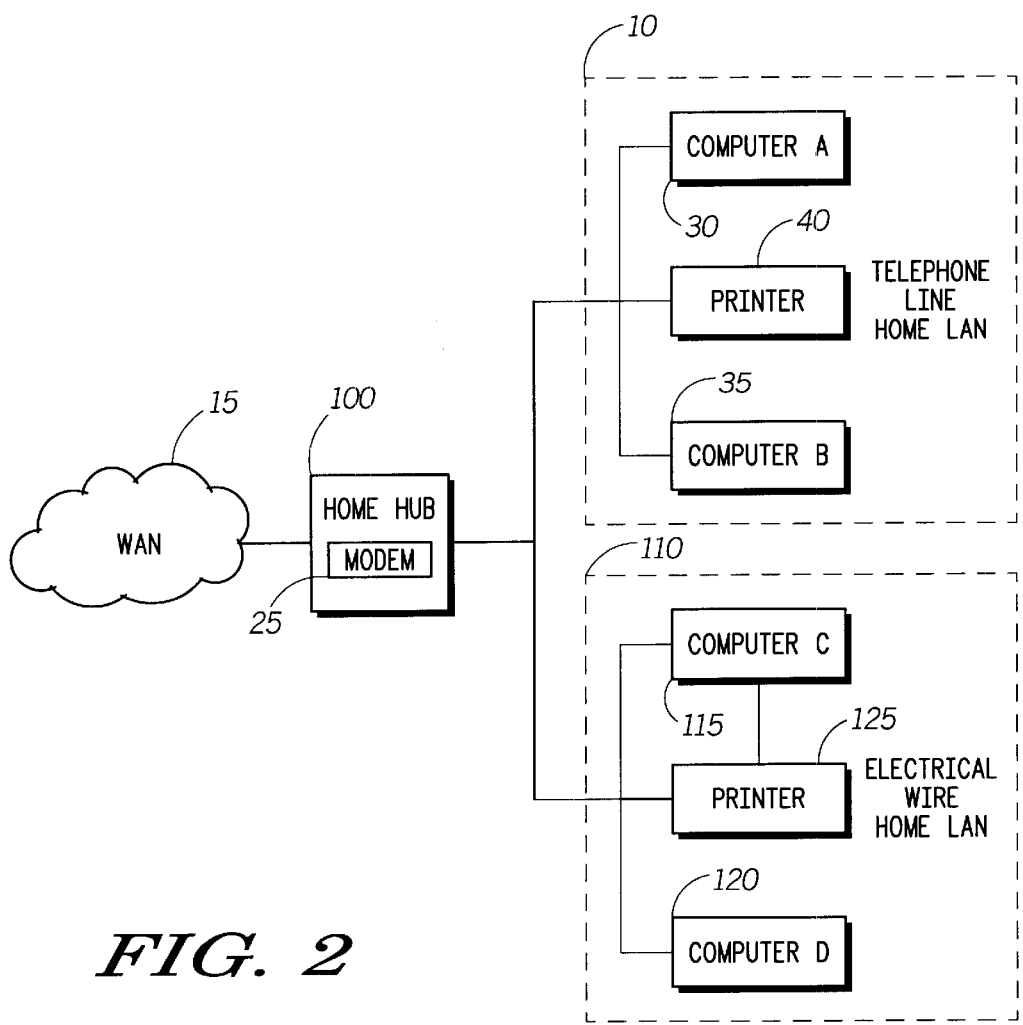
FIG. 2 is a block diagram of a home network according to a preferred embodiment of the invention.

FIG. 2 shows the home networking architecture according to a preferred embodiment of the invention. The home hub 100 has a modem 25 as in FIG. 1 to establish a connection to the wide area network (WAN) 15. The home hub 100 also provides a hub connection to the first LAN 10, also shown in FIG. 1, here a telephone wire LAN, and a second LAN 110, here an electrical wiring LAN. In an alternative embodiment of the present invention, either of the LANs 10, 110 could be a wireless LAN. The first LAN 10 connects three devices, Computer A 30, Computer B 35, and a printer 40. The second LAN 110 connects Computer C 115, Computer D 120 and a second printer 125. The home hub 100 combines two different physical media to provide greater access to the network from more places in the home.

Figure 3:
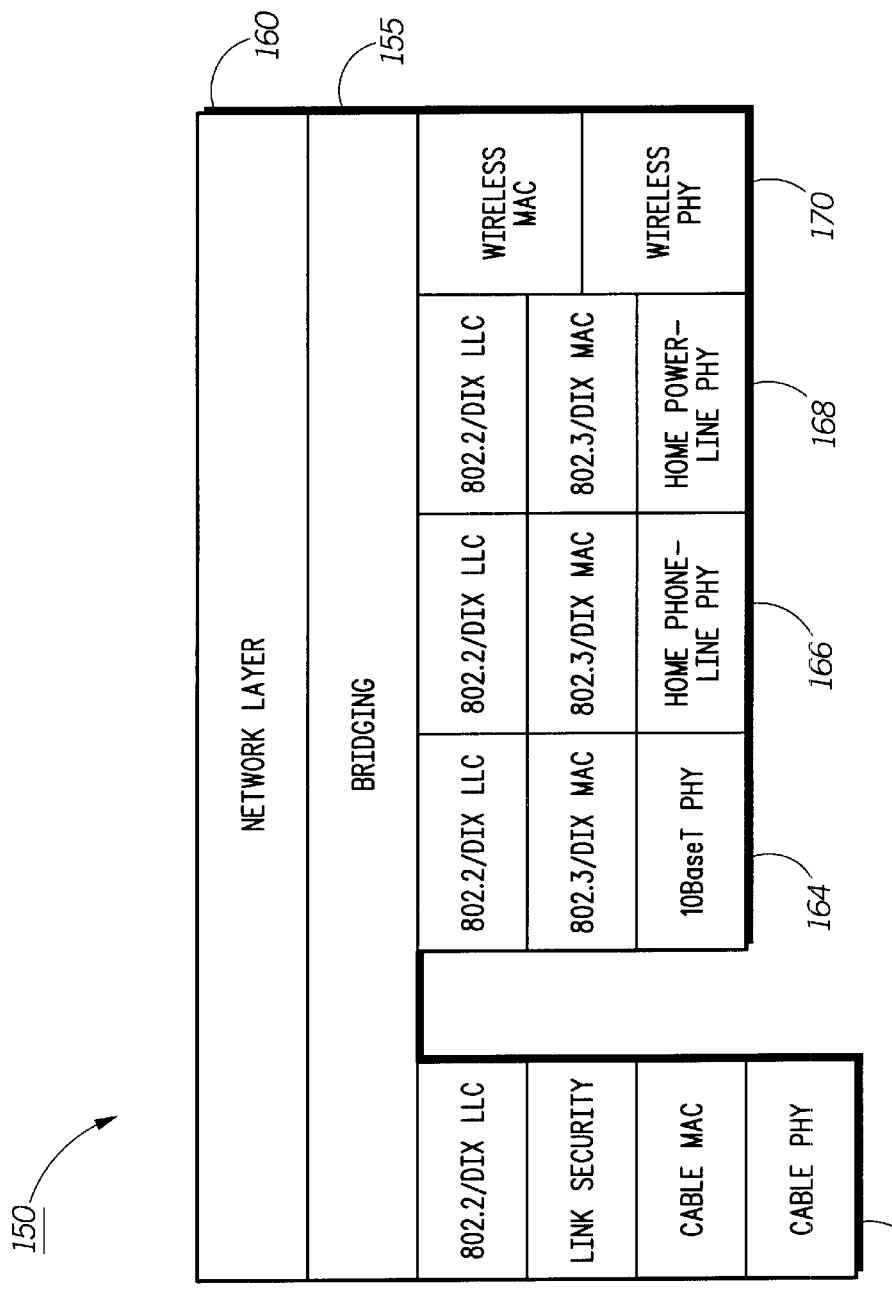
FIG. 3 is a block diagram of a communication stack of the home hub of the home network shown in FIG. 2.

FIG. 3 shows a communications stack 150 to be implemented in the home hub shown in FIG. 2, which in the present embodiment of the invention, already provides 802.3 10BaseT Ethernet connection to transparently combine the first LAN on telephone wiring and a second LAN on electrical wiring. A network layer 160, using a protocol such as TCP/IP, connects the home hub to the WAN. The bridging layer 155 establishes a connection between a cable modem substack 162, a 10BaseT connection substack 164, a telephone line substack 166, an electrical wiring substack 168, and a wireless network substack 170 in the hub communications stack 150. The bridging layer 155 enables devices connected on the different transmissions media to communicate with each other so that a device connected to the network, for example, via a power line can communicate with a device connected to the network via a telephone line. The home hub actively supports the various transmissions media while combining individual LANs together with a bridge at the Medium Access Control layer (MAC layer). The MAC layer is one of two sublayers that make up the Data Link Layer of the Open System Interconnection (OSI) model of the International Organization for Standardization (ISO). The MAC layer is responsible for moving data packets to and from one Network Interface Card (NIC) to another across a shared channel. The MAC sublayer uses MAC protocols to ensure that signals sent from different stations across the same channel do not collide. Different protocols are used for different shared networks, such as Ethernets, Token Rings, Token Buses, and WANs.

Figure 4:
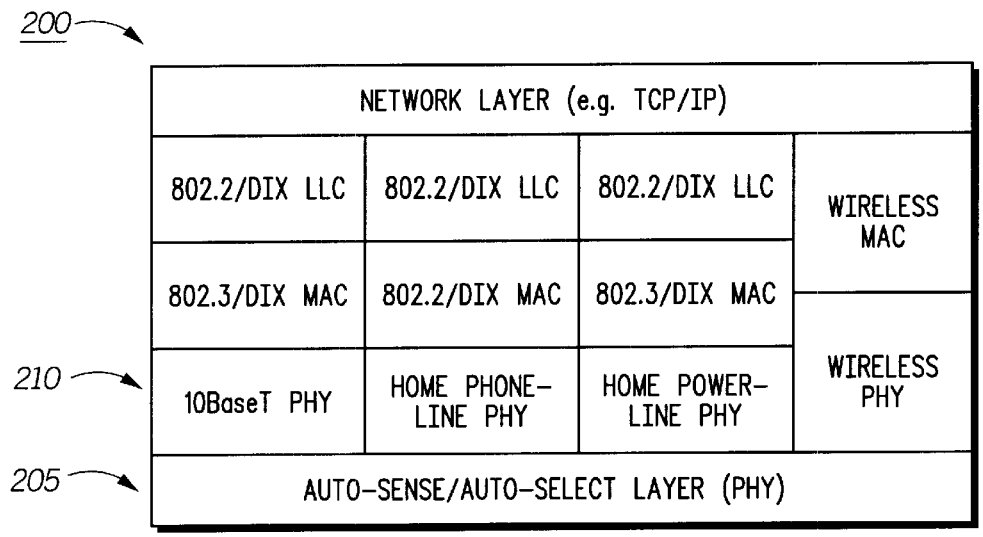
FIG. 4 is a block diagram of a communication stack used in a communications device according to principles of the present invention.

FIG. 4 shows an exemplary communication stack 200 of a communication device, such as a computer or a printer to be used in conjunction with the home hub shown in FIG. 2. The home hub treats each separate physical medium, i.e. telephone wire, electrical wire, or wireless, as an individual LAN and combines them together with a bridge at the MAC layer, as described above in the discussion of FIG. 3.

Referring again to FIG. 4, each communication device added to the network selects the desired transmissions medium from the available transmissions media by means of an auto-sense/auto-select layer 205 underneath a physical layer 210 as shown in the exemplary communication stack 200. The auto-sense/auto-select layer 205 manages the procedure for the communications devices to join/register in the network. The auto-sense/auto-select process is handled below the MAC layer. As such, there is no change imposed on the MAC layer used, and no MAC layer address for a particular communication device is used for the purpose of auto-sense/auto-select process. All communications devices, however, may not be enabled for all available transmissions media. For example, a communications device may have only 10BaseT and telephone line capability or some other combination of transmissions media. Therefore, the communications stack in FIG. 4 is merely exemplary. Other configurations are possible within the scope of the present invention.

Figure 5:
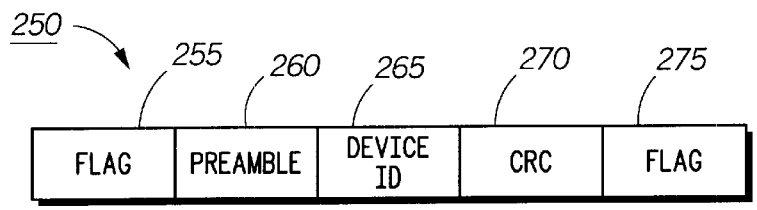
FIG. 5 is a block diagram of a self-ID message according to a preferred embodiment of the invention.

FIG. 5 shows a self-ID message 250. The auto-sense process does not involve transmitting any signal onto the medium. Rather, it involves auto-sensing, i.e. checking, for the presence of self-ID messages sent by other communication devices already active on the medium. The self-ID message 250 has a first flag field 255, a preamble field 260, a device ID field 265, a cyclic redundancy check (CRC) field 270 for error checking, and a second flag field 275. The first flag field 255 and the second flag field 275 mark the beginning and end respectively of the data packet. The preamble field 260 contains data sequences to be used for general signal conditioning and to assist in timing recovery and possibly for detecting the collision of transmitted signals in the media. In the present invention, the data sequence is a predetermined pseudorandom sequence known to receiving devices on the network. The receiving devices determine qualities of transmission in the network from the condition of the preamble data. The device ID field 265 holds the identification of the device sending the self-ID message 250. Each device on the network periodically sends out a self-ID message. When a new device is added to the network, the new device collects self-ID messages from the network in order to determine network population and configuration.

Figure 6:
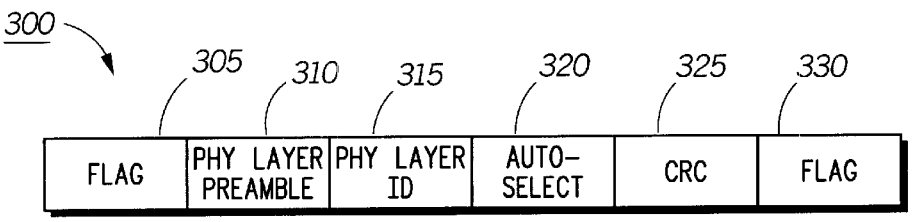
FIG. 6 is a block diagram of an auto-select message according to a preferred embodiment of the invention.

FIG. 6 shows an auto-select message 300. The auto-select process involves a newly connected device transmitting special physical (PHY) layer messages and waiting for special acknowledgments from the existing communication devices in the network. The auto-select message 300 has a first flag field 305, a PHY layer preamble 310, a PHY layer ID field 315, an auto-select field 320, a CRC field 325, and a second flag field 330. The first flag field 305 and second flag field 330 mark the beginning and end respectively of the data packet. The PHY layer preamble 310 is used by the newly connected device to detect the presence of a signal and possible collisions of signals in the medium, and to set up necessary receiver parameters. The PHY layer ID field 315 contains the identity of the source of the auto-select message. A special data stream, which is a pseudo-random sequence contained in the auto-select field 320, is used by the newly connected device to calculate signal quality measures.

Figure 7:
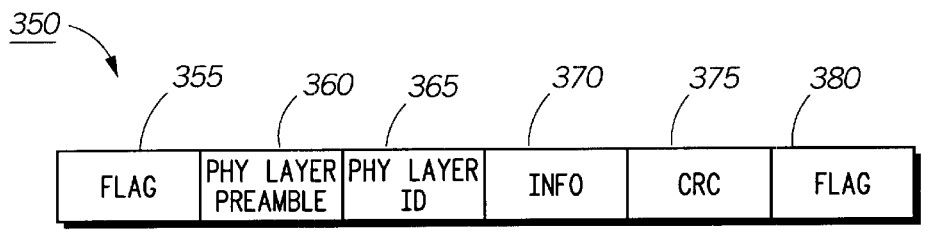
FIG. 7 is a block diagram of an acknowledgment message according to a preferred embodiment of the invention.

FIG. 7 shows an acknowledgment message 350 that has a first flag field 355, a PHY layer preamble field 360, and PHY layer ID field 365, an information field 370, a CRC field 375 and a second flag field 380. The first flag field 355 and second flag field 380 mark the beginning and the end respectively of the data packet. The PHY layer preamble 360 is used to detect the presence of a signal and possible collisions in the medium, and to set up necessary receiver parameters. The PHY layer ID field 365 contains the identity of the source of the acknowledgment message. The CRC field 375 is for error checking. The acknowledgment message 350 is sent in response to an auto-select message and has encoded signal quality information in the information field 370 on the received auto-select message. Signal quality information includes the mean squared error, i.e. the deviation of the signal's mean value which can be used to determine the quality of the network channel. The signal quality information also includes the received signal level. Either or both of these items may be included in the acknowledgment message 350.

Figure 8:
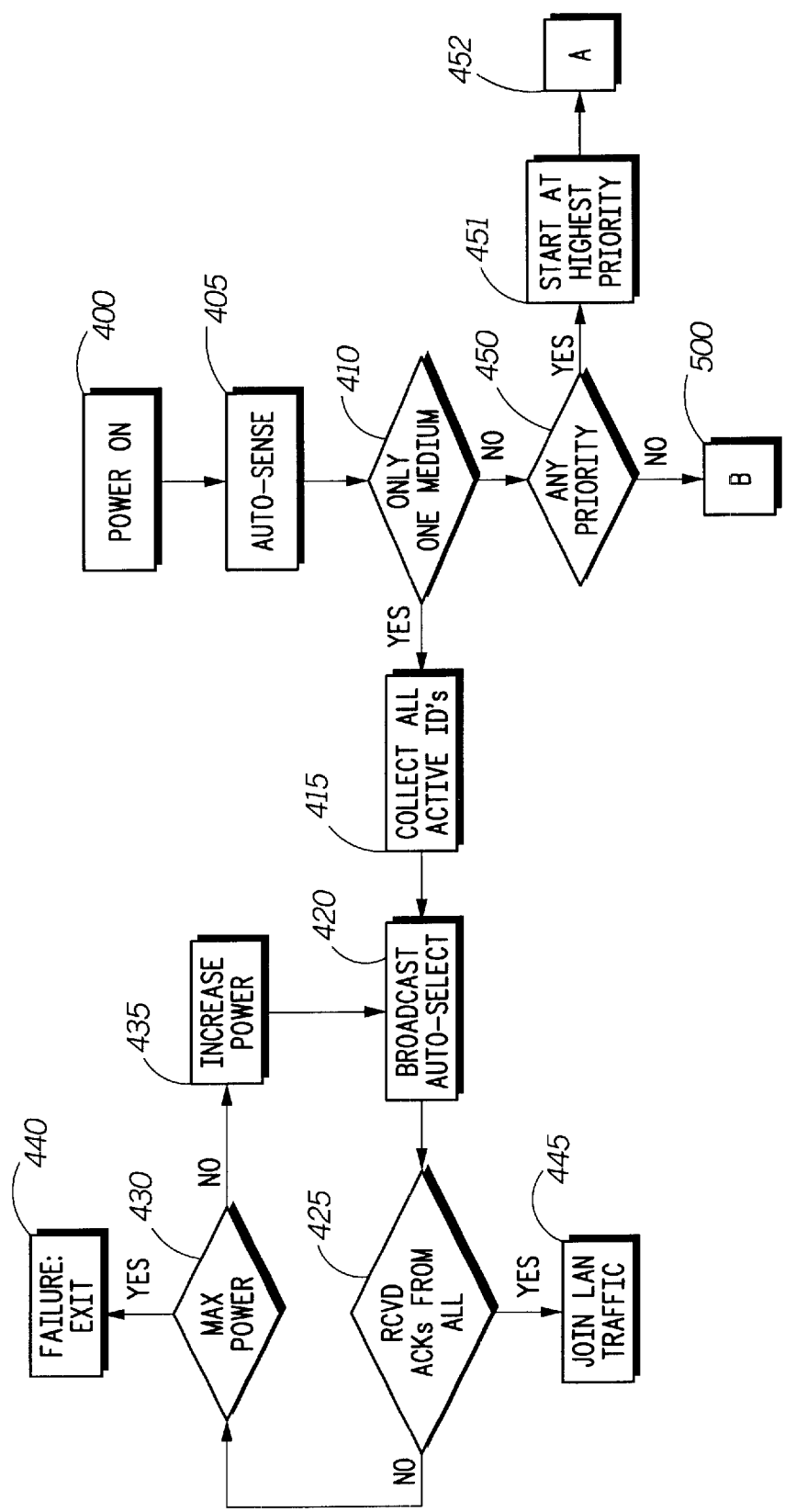
FIG. 8 is a first flow chart of the auto-sense/auto-select process of the home network shown in FIG. 2, showing the device registration process where only one medium is available.

FIG. 8 is a first flow chart of the auto-sense/auto-select process. A communications device connected to a network may be connected to one or more data transmissions media, e.g. a 10baseT connection or electrical wires or phone lines. When the communications device connected to the network is first powered on, block 400, it auto-senses the availability of each transmissions medium, block 405. If the existence of only one active transmission medium is detected, block 410, then the device listens to traffic and acquires the PHY layer identifications (IDs) from the self-ID messages of existing devices in the network, block 415. The new device accomplishes this by listening for self-ID messages for a predetermined length of time after which it is presumed that all active devices on the network have been detected. The device then broadcasts an auto-select message and waits for acknowledgements, block 420. If the new device does not receive a positive acknowledgment from all active devices in the network, block 425, and the maximum transmission power has not yet been reached, the device resends the auto-select message with a higher power, block 435. The join/register process ends after receiving an acknowledgment from every active device on the network, block 425. The new device then joins regular LAN traffic, block 445. In the event that acknowledgments from all devices on the medium have not been received, and maximum power has been reached, the process of registering the device on the network fails and ends, block 440.

In the event that the new communication device auto-senses the availability of more than one transmission medium when it is first powered on, block 410, the device checks whether it has a priority configuration for transmissions media, block 450, (priority configuration can be done at the factory, or by the user). If there is a priority configuration in place, the device chooses a transmission medium accordingly, i.e. the device starts on the medium with the highest priority, block 451. It then follows a prioritized auto-select process, block 452, shown in FIG. 9 and described in detail below.

Figure 10:
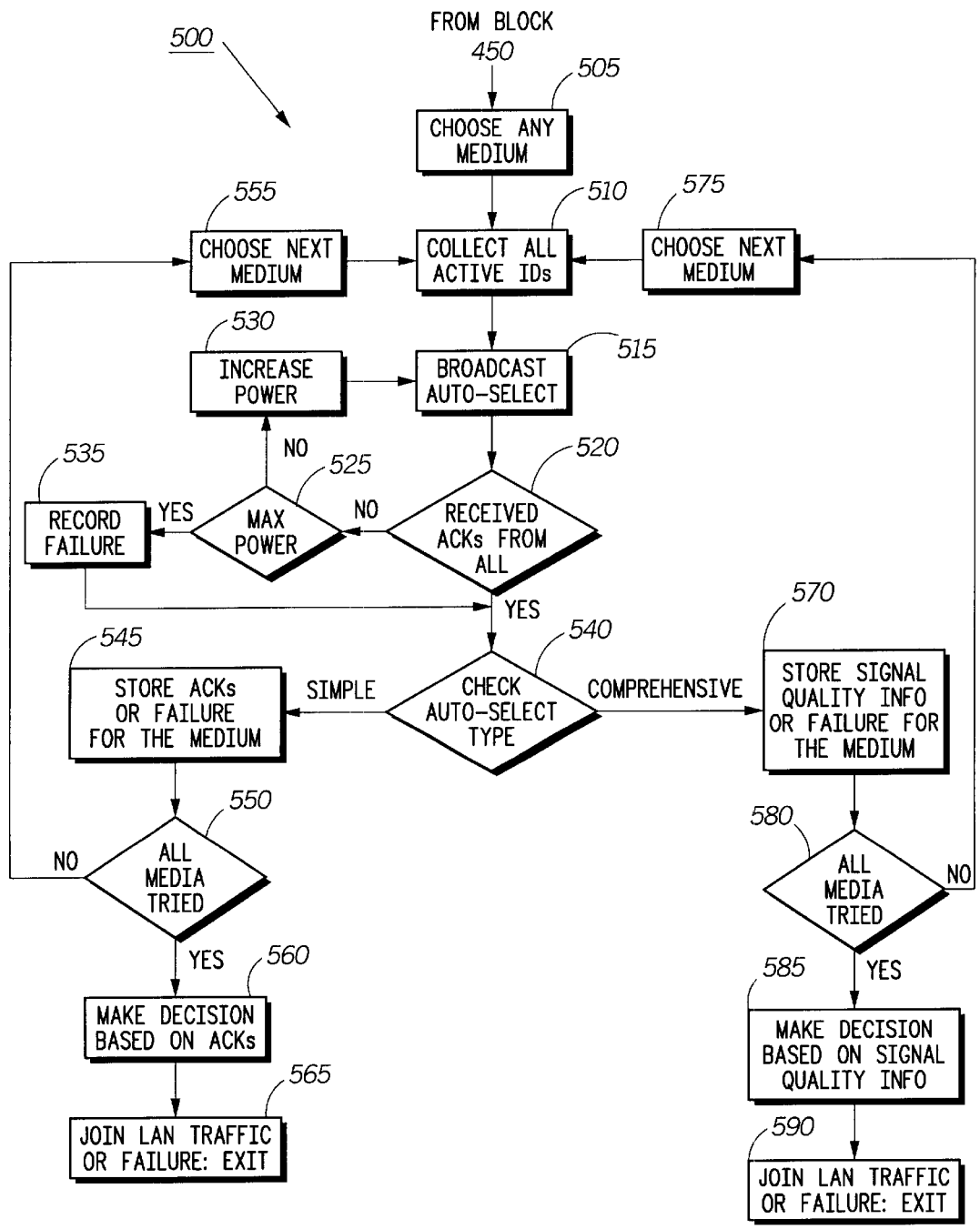
FIG. 10 is a third flow chart of the auto-sense/auto-select process of the home network shown in FIG. 2 showing a simple auto-select process and a comprehensive auto-select process used when multiple media are available but no priority configuration is in place.

If the device is not pre-configured with a priority for any one of the transmissions media, it follows either a simple or a comprehensive auto-select process, block 500, shown in FIG. 10. Whether the simple or comprehensive process is followed depends on how a parameter called "auto-select type" is set.

Figure 9:
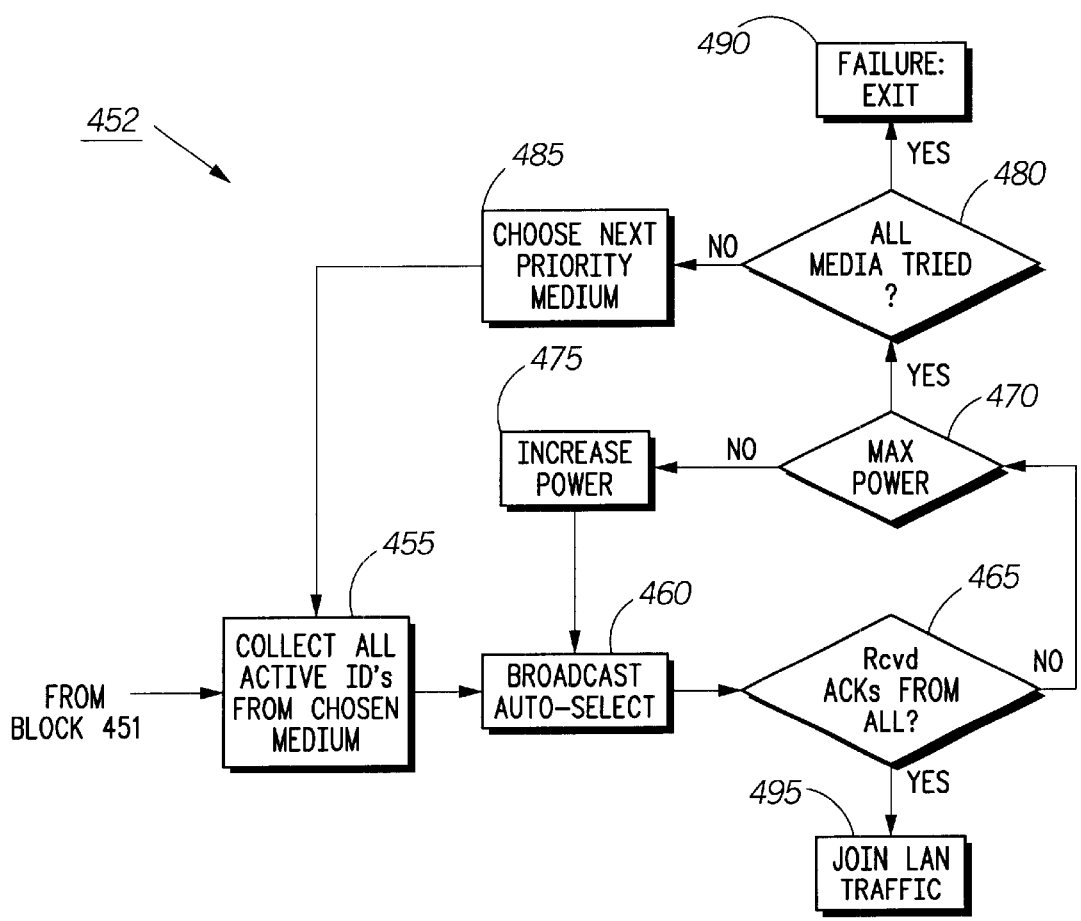
FIG. 9 is a second flow chart of the auto-sense/auto-select process of the home network shown in FIG. 2, showing the device auto-select process where a priority configuration is in place.

FIG. 9 shows the prioritized auto-select process 452, shown in FIG. 8. The new device listens to traffic on the selected medium and acquires the PHY layer identifications (IDs) of existing devices in the network, block 455. The new device then broadcasts an auto-select message and waits for acknowledgements, block 460. If the new device receives acknowledgments from all the devices, block 465, from whom it has IDs, i.e. from all active devices on the network, the new device joins the network over the selected medium, block 495. If the new device does not receive a positive acknowledgment from all active devices in the network, block 465, and the maximum transmission power has not yet been reached, block 470, the device increases its broadcast power, block 475 and resends the auto-select message, block 460. In the event that acknowledgments from all devices on the medium have not been received, block 465, but maximum power has been reached, block 470, the new device checks for other transmission media to try, block 480. If all the media have been tried, the process ends, block 490. If all the media have not been tried, the new device chooses the medium having the next highest priority in the priority configuration, block 485 and the process of collecting IDs, block 455, etc. begins again until either the device is registered on one of the available media or all the choices of media are exhausted.

FIG. 10 shows the simple and comprehensive auto-select processes 500 which are used when a plurality of media is available and when no priority configuration is in place. First, the newly connected device chooses one of the available media in the network, block 505. The new device then collects the IDs of all active devices on the chosen medium, block 510, and broadcasts an auto-select message over the chosen medium, block 515. If acknowledgments are not received from all active devices on the chosen medium, block 520, and maximum transmission power has not been reached, block 525, the new device increases its transmission power, block 530 and sends out another auto-select message 515. If maximum transmission power has been reached, block 525, the new device records the failure, block 535. If either the maximum power has been reached, block 525, or all acknowledgments have been received, block 520, the new device checks the setting of the auto-select type variable, block 540. If the auto-select type is "simple," the new device stores the acknowledgments or records the failure for the medium to be used as data in selecting the transmissions medium, block 545. The new device checks whether all available media on the network have been tried, block 550. If all available media have not been tried, the new device chooses a next medium, block 555, and begins the acknowledgment process on the new medium by returning to the step of collecting IDs of all active devices, block 510.

If the auto-select type is "comprehensive," the new device stores signal quality information calculated from data provided by other devices in the network in the acknowledgment messages, or the new device records the failure for the medium, block 570. The signal quality information can include either the mean squared error or the signal power level as described above. The new device records whether the mean squared error is below a predetermined threshold that allows for reliable decoding of the signal in the specific modulation format of the network, and/or the signal power level is above a predetermined threshold. If the signal quality does not meet one or both of these thresholds, the new device records the failure of the medium instead. The new device then checks for other available media, block 580. If all the media have not been tried, the new device chooses a next medium, block 575, and begins the acknowledgment process on the new medium by returning to the step of collecting IDs of all active devices, block 510. If all media have been tried, block 580, the new device makes its auto-select decision based on stored signal quality information, block 585. The new device then joins the network over the medium which has signal quality within acceptable parameters or the process fails and ends, block 590.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for connecting a communications device to a network having a plurality of transmissions media, comprising the steps of:
   a) determining availability of each of the plurality of transmissions media in the network;
   b) collecting data from each of the plurality of available transmissions media in turn; and,
   c) determining in response to said collected data on which of the plurality of transmissions media to establish a network connection from the communications device to the network, wherein the step of collecting data further comprises:
   selecting a first available transmissions medium from the plurality of transmissions media;

acquiring self-ID messages from devices connected to said selected transmissions medium;

broadcasting an auto-select message on said selected transmissions medium;

receiving acknowledgment messages broadcast by said devices connected to said selected transmissions medium in response to said auto-select message; and choosing a next available transmissions medium from the plurality of transmissions media, and repeating the steps of selecting, acquiring, broadcasting and receiving, until all available transmissions media have been examined.

2. The method of claim 1 wherein the step of determining availability further comprises sensing data traffic in each of the plurality of transmissions media.

3. The method of claim 1 further comprising the step of providing, in each of said self-ID messages, a device identification of a sending device.

4. The method of claim 3 further comprising the step of providing, in each of said self-ID messages, a data sequence for determining signal quality in said selected transmissions medium.

5. The method of claim 1 providing in said auto-select message an identity of the communications device connecting to the network.

6. The method of claim 5 further providing in said auto-select message a special data stream whereby the communications device connecting to the network can calculate signal quality.

7. The method of claim 1 providing in said acknowledgment message an identification of an acknowledging device connected to the network.

8. The method of claim 7 further providing in said acknowledgment message signal quality information.

9. The method of claim 1 wherein said data collecting step further comprises collecting device IDs of communications devices already connected to the network.

10. The method of claim 1 wherein said data collecting step further comprises collecting signal quality information from communications devices already connected to the network.

11. The method of claim 1 wherein said network connection determining step further comprises determining if acknowledgment messages have been received from all communications devices connected to a particular transmissions medium.

12. The method of claim 1 wherein said network connection determining step further comprises comparing signal quality in the available transmissions media and connecting to the transmissions medium having the best signal quality.

13. A method for connecting a communication device to a network having a plurality of transmissions media, comprising the steps of:

a) auto-sensing available transmissions media on the network from network traffic;

b) selecting a first available transmissions medium;

c) collecting IDs from all active devices on said selected transmissions medium;

d) broadcasting an auto-select message on said selected transmissions medium;

e) receiving acknowledgment messages from active devices on said selected transmissions medium in response to said auto-select message;

f) storing said received acknowledgment messages;

g) choosing a next available transmissions medium from the plurality of transmissions media;

h) repeating steps c-g until all transmissions media have been examined; and, i) determining in response to said stored acknowledgments which of the plurality of transmissions media is to be used for establishing a network connection from the communication device to the network.

14. A communications device for a network having a plurality of transmissions media, comprising:

a) availability means for determining availability of each of a plurality of transmissions media in the network;

b) collection means for collecting data from each of the plurality of available transmissions media in turn; and, c) network connection means for determining in response to said collected data on which of the plurality of transmissions media to establish a network connection from the communications device in the network, wherein said collection means further comprises:

selecting means for selecting a first available transmissions medium from the plurality of transmissions media;

self-ID collecting means for acquiring self-ID messages from devices connected to said selected transmissions medium;

auto-select means for broadcasting an auto-select message on said selected transmissions medium;

acknowledgment means for receiving acknowledgment messages broadcast by said devices connected to said selected transmissions medium in response to said auto-select message; and, means for choosing a next available transmissions medium from the plurality of transmissions media, and continuing until all available transmissions media have been examined.

15. The communications device of claim 14 wherein said availability means further comprises means for sensing data traffic in each of the plurality of transmissions media.

16. The communications device of claim 14 wherein said collection means further comprises collecting device IDs of communications devices already connected to the network.

* * * * *